June 29, 1937.                L. PRICE                2,085,330
CONFECTIONERY PRODUCT
Filed April 9, 1936
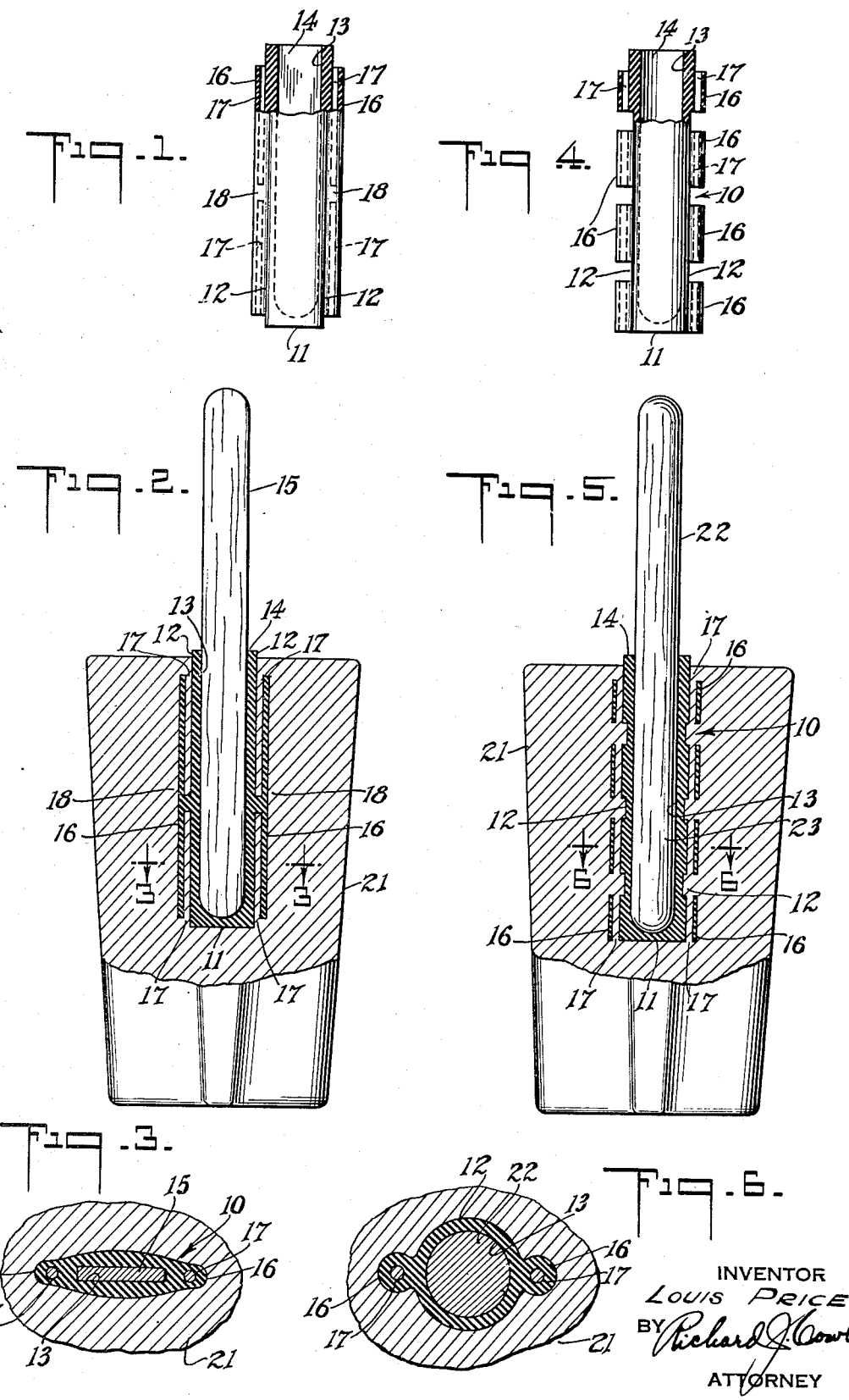
INVENTOR
LOUIS PRICE.
BY Richard J. Cowling
ATTORNEY Patented June 29, 1937

2,085,330

UNITED STATES PATENT OFFICE 2,085,330

CONFECTIONERY PRODUCT

Louis Price, New York, N. Y., assignor to Joe Lowe Corporation, New York, N. Y., a corporation of Delaware Application April 9, 1936, Serial No. 73,524

3 Claims. (Cl. 99—137)

The present invention relates generally to improvements in edible confectionery products, and it has particular relation to a confectionery product that may be characterized in the trade as a "candy lollypop" or "frozen sucker", both being dispensed and eaten from a supporting handle member.

An object of the invention is to provide a confectionery product of the character described, wherein the supporting handle member may be inserted at the place and time of sale, which provides for convenience, efficiency and economy in wrapping, packaging and distributing by the utilization of space ordinarily wasted when the handle supporting member is rigidly and permanently secured in the edible body during the process of manufacture.

Another object of the invention is the provision of a confectionery product wherein the handle supporting member utilized to facilitate manipulation during the period the product is being eaten may be removed at any time, and more especially at the time and place of sale so that the purchaser may, if desired, determine at the moment of purchase whether or not he is entitled to a prize, which may be indicated on the hidden end of the handle member.

A further object of the invention is to provide for the use of a relatively inexpensive receiving socket, which may be made of materials having an inherent characteristic of not being capable of being securely attached or bonded to the edible mass upon hardening or congealing, whereby suitable means are provided for securing said socket member to said mass by a portion of said mass and without depending upon the ability of the substance and the socket member to naturally become bonded together.

Another object of the invention is the provision of a relatively inexpensive flexible receiving socket member, which may be formed of thin rubber or other similar materials incapable of becoming securely and permanently bonded together, whereby suitable anchoring means is provided by utilizing a portion of the edible substance itself.

Other and further objects and advantages of the invention reside in the detailed construction of the receiving socket, resulting in simplicity, economy and efficiency, and which will be apparent from the following description, wherein preferred forms of embodiment of the invention are shown, reference being had to the accompanying drawing, forming a part hereof, in which:

Fig. 1 is a front elevational view of one form of handle receiving socket member constructed in accordance with the invention, with parts being broken away to more clearly show the construction thereof;

Fig. 2 is a longitudinal sectional view, partly in elevation, illustrating the manner in which the handle receiving member shown in Fig. 1 is imbedded within the edible body portion of a confectionery product, and also illustrating the manner in which the rigid supporting handle is positioned therein;

Fig. 3 is a fragmentary transverse sectional view, on an enlarged scale, of the confectionery product shown in Fig. 2, the same being taken substantially along the line 3—3 thereof;

Fig. 4 is a view similar to Fig. 1, but illustrating a modified form of handle receiving socket member embodying the invention;

Fig. 5 is a view similar to Fig. 2, but illustrating the modified form of socket member shown in Fig. 4; and Fig. 6 is a fragmentary transverse sectional view, on an enlarged scale, of the confectionery product shown in Fig. 5, the same being taken substantially along the line 6—6 thereof.

Referring now to the drawing, wherein like figures indicate like parts, there is shown in Figs. 1, 2, and 3 one form which my invention may assume, which comprises a hollow flexible handle receiving member 10, which may be made of thin rubber or other suitable materials, having a closed bottom 11 and sides 12 thereby forming a rectangular recess or socket 13, open at the top end thereof as indicated at 14, and adapted to receive a correspondingly shaped handle member 15 for manipulation of the product 21 to facilitate eating the same. Hollow fins 16 are integrally formed with the member 10 and project from the outer surface thereof, providing recesses or openings 17 into which the edible substance 21, when in a fluid or semi-plastic condition, may flow. In Figs. 1, 2, and 3, it will be noted that the openings 17 do not extend entirely through the fins 16, but only part of the way or to the partition 18, and that the fins 16 do not extend entirely to the bottom 11 and top 14 of the member 10. The reason for this is that the openings 17 adjacent the top 14 must be slightly below the liquid level of the mold (not shown) while the recess 13 must be above the liquid level, and if the fins 16 were flush with the top 14 it would be impossible to fill the anchoring fins 16 without also filling the recess 13. The reason the fins 16 do not extend flush with the bottom 11 is because, in some instances, the bottom 11 may be inserted in the liquid mass 21 until it comes in contact with the bottom of the mold (not shown), in which event such contact would be likely to seal the openings 17 of the fins 16 if they extended all the way to the bottom of the member 10, thereby preventing the liquid from entering into the bottom openings 17 of the fins 16.

In the modified form of construction shown in Figs. 4, 5, and 6, it will be apparent that the handle receiving member 10 has a circular recess 13, which is adapted to receive a round handle member 22. In this modification it will also be noted that the fins 16 are relatively short in length and are spaced longitudinally and circumferentially of the member 10, with the openings 17 extending entirely therethrough. With the exceptions herein mentioned, the member 10 in Figs. 4, 5, and 6 is identical with the member 10 shown in Figs. 1, 2, and 3.

The handle receiving member 10 may be suitably positioned in the edible substance in a mold (not shown) by any suitable means such as being slipped over the end of a handle stick 15 or 22, or a depending prong (not shown), which may be suspended above the top of the mold when the substance is still in a liquid or semi-plastic condition. In this position, which is substantially the position shown in Figs. 2 and 5, the temperature of the substance is lowered until it hardens, solidifies or congeals and thereby combining the substance 21 and handle receiving member 10 into an integral mass or confectionery body.

In practice it was found necessary, since the member 10 is constructed of thin rubber or some other suitable material of a flexible nature which will not become securely attached or bonded to the edible substance upon hardening, or congealing, to devise some suitable means for securely anchoring the member 10 in the edible body 21. To accomplish this I have provided the handle receiving member 10 with a plurality of hollow fins 16, having openings 17 therein or therethrough, into which the substance 21 could enter and pass therethrough to form a continuous path of the substance in and/or entirely through the openings 17 of the fins 16, thereby forming, upon hardening or congealing, a positive anchoring means between the member 10 and the edible body 21 by a portion of the latter substance.

Since the rigid handle member 15 or 22 does not at any time come in direct contact with the edible substance 21, it is obviously separable and removable at any time upon the will of the holder. The separability of the handle member from the edible portion manifestly facilitates wrapping and packaging, and the placing of more confectionery products in a single carton than heretofore possible with confections having the handle member securely imbedded therein during their manufacture. The reason for this is that the handle members may be removed and packed separately, and the confectionery bodies packed closely together like bricks, etc.

The removability of the handle member from the confectionery body portion of my novel product obviously lends the product to use in novel sales contests, wherein hidden prizes are awarded to certain lucky purchasers, who are successful enough to purchase a confection containing a prize feature. With my novel invention, it is not necessary for the purchaser, who may or may not be the consumer, to eat the product before he knowns whether or not he is entitled to a prize, which is generally indicated on the imbedded end of the handle member, as indicated at 23, but he may immediately remove the handle member and, if lucky, submit it for redemption before leaving the place of sale.

Although I have only described two modifications which my invention may assume, it will be readily apparent to those skilled in the art that the invention is not so limited, but that various modifications may be made therein without departing from the spirit of the invention or from the scope of the appended claims.

What I claim is:

1. A confectionery product of the character described comprising a body portion composed of an edible substance which hardens upon a lowering of its temperature, and having a hollow rubber handle receiving member imbedded therein with its open end extending exteriorly of the body to form a socket, said member having a plurality of hollow projections extending from its outer surface adapted to receive a portion of the substance for providing anchoring means for permanently securing said socket member in said body when it is hardened.

2. A confectionery product of the character described comprising a body portion composed of an edible substance which solidifies upon a lowering of its temperature, and having a hollow rubber handle receiving member imbedded therein with its open end extending exteriorly of the body to form a socket, said handle receiving member having a plurality of spaced tubular projections extending outwardly from the sides thereof adapted to permit a portion of the substance to enter and pass therethrough, which substance, upon hardening, provides permanent anchoring means for said socket member.

3. A confectionery product of the character described comprising a body portion composed of an edible substance which solidifies upon a lowering of its temperature, and having a hollow rubber handle receiving member imbedded therein with its opening exposed exteriorly of said body, said rubber member having integral hollow fins spaced exteriorly thereof adapted to receive a portion of said edible substance, said portion, upon solidification, providing means for anchoring said member in said body portion.

LOUIS PRICE.